United States Patent [19]

English, Jr.

[11] 4,398,391
[45] * Aug. 16, 1983

[54] SOLAR ENERGY CONVERSION APPARATUS PROVIDED WITH AN AUTOMATIC CUT-IN HEAT-SUPPLYING STANDBY APPARATUS

[76] Inventor: Edgar English, Jr., 45125 Redwood Ave., Lancaster, Calif. 93534

[*] Notice: The portion of the term of this patent subsequent to Mar. 15, 2000, has been disclaimed.

[21] Appl. No.: 155,794

[22] Filed: Jun. 2, 1980

[51] Int. Cl.³ .............................................. F01K 7/02
[52] U.S. Cl. ................................. 60/641.15; 60/676; 126/427; 126/448
[58] Field of Search ................... 60/641.8, 641.15, 676; 126/427, 440, 442, 448

[56] References Cited

U.S. PATENT DOCUMENTS

| | | | |
|---|---|---|---|
| 3,822,692 | 7/1974 | Demarest | 60/641.15 X |
| 4,047,385 | 9/1977 | Brinjevec | 126/427 X |
| 4,191,901 | 3/1980 | Branover | 60/641.8 X |

*Primary Examiner*—Allen M. Ostrager
*Assistant Examiner*—Stephen F. Husar

[57] ABSTRACT

An improved solar energy conversion apparatus for effectively converting solar radiation thermal energy, on a high-efficiency basis, into captive stored thermal energy in a captive working medium in a closed-cycle power conversion system (usually consisting of flow-path-defining apparatus such as piping, tubing or the like) and adapted at an output end to be connected to any of various different types of thermal energy utilization apparatus which will effectively reduce the temperature and/or pressure of the working medium as a consequence of the effective extraction of substantial quantities of energy from the working medium by such utilization apparatus, and normally provided with a return-flow line (usually ducting or the like) adapted to be connected from an output side of such utilization apparatus back to a low-thermal-energy input end of the flow-path-defining apparatus of the power conversion system. An important feature is the provision of, and the effective coupling with the solar energy conversion apparatus of, an automatic cut-in, auxiliary, heat-supplying standby apparatus coupled thereto in a manner such as to provide either a substantially constant desired level of thermal energy input into the working medium of the closed-cycle power conversion system despite input solar radiation thermal energy variations, or to provide for the maintainence of the total transferred thermal energy input within certain predetermined upper and lower limits.

10 Claims, 17 Drawing Figures

SOLAR ENERGY CONVERSION APPARATUS PROVIDED WITH AN AUTOMATIC CUT-IN HEAT-SUPPLYING STANDBY APPARATUS

BACKGROUND OF THE INVENTION

The field of the invention is generally that of solar energy heating apparatus or solar energy power plants, a great many different forms of which have been developed in the prior art. For example, there have been solar ovens or solar cookers developed where large lenses or focusing mirrors are employed in a manner analagous to the widely-experienced practice of youngsters in using a conventional reading type of magnifying lens for focusing sunlight onto a very small concentrated spot on a material having a low ignition temperature (such as paper or the like) and either burning a hole in the paper or actually setting it on fire. In such prior art solar cookers or ovens, such concentrated heat is focused on a food object, or into a closed region containing a food object, so that the food object will be heated and all of the entering focused heat will be captured and retained, thus having an oven-like cooking effect on the food object. There have been other prior art solar energy power plants which have employed a similar focusing principle for attempting to produce in a small area a very high temperature from banks of lenses and/or focusing mirrors for heating use or for use as input to a heat engine. There have also been large surface area solar energy receptor (often roof-mounted), usually colored as nearly black as possible for maximum receptivity, for imparting heat at a relatively low level to a considerable volume of circulatable liquid which can then be piped through a building for providing interior heating, primarily by radiation into the interior space areas which are desired to be heated. However, there have also been certain moving solar energy focusing systems devised in the past, but, virtually all of such prior art systems have had disadvantages of one type or another. The least disadvantaged of said prior art systems has comprised certain of the solar cookers or solar ovens which have worked reasonably well, although they have been somewhat delicate and, in certain cases, somewhat expensive and in virtually all cases, have been subject to meterological variations in the available solar energy for use in such solar energy cookers.

Probably the second least disadvantaged of the above-mentioned prior art types of solar energy systems comprises the large area flat panel solar energy collectors used for heating circulatable liquids to a relatively low temperature for circulation within a building for space heating purposes and the like. Certain of said systems have worked reasonably well, although being somewhat limited by the relatively large capital cost of the initial system and the cost of installation thereof, plus also being subject to the vagaries of the weather. The least efficient of the prior art solar energy systems mentioned above has been the type of system intended to comprise a power plant having a useful mechanical power output or electrical power output because of the relatively low temperature of any solar-energy-heated working medium fed to a heat engine as input energy, which always greatly decreases the efficiency of such a system and the relative capital cost per unit of output power produced by such a system. Additionally, the types of such prior art solar energy power plant systems which attempted to increase the input temperature of the working medium by laying great stress on the initial focusing of very large quantities of sunlight onto a very small heat transfer area associated with the working medium, have had the major disadvantage of the very great cost involved for the kind of lens and/or focusing mirror means required for this type of system, plus the great fragility of a relatively large system employing either few very large solar energy collectors and focusers or large banks of smaller ones.

Furthermore, virtually all such prior art systems have suffered from one major and very serious disadvantage arising from the unavoidable meteorlogically-caused variations in the input solar radiation received by the apparatus and effectively converted into transferred captured thermal energy in the working medium of the system. For example, on days when the sun is either partially or wholly obscured, and of course during all portions of the twenty-four hour day-night period when the sun is normally below the horizon, such a prior art system has either reduced or virtually zero input and thus, little or no thermal energy is transferred into the captive working medium, and the thermal-energy-utilization apparatus must either operate entirely on previously stored energy or must cease to operate until the solar input energy returns and/or increases. This has been a serious disadvantage greatly limiting and handicapping the commercial expansion and general usage of solar energy conversion systems.

It is obvious that any solar energy conversion apparatus which (1) would not require such excessively large and expensive optical means for transferring solar energy into a working medium in a manner such as to raise the temperature of the working medium to a relatively high level for greater efficiency of operation of a power plant fed thereby would be a highly-advantageous apparatus or system and (2) which would compensate for periods of low or zero solar energy input to the system would be a highly advantageous apparatus or system and it is precisely such a highly desirable and advantageous type of solar energy conversion apparatus that is provided by, and in, the present invention, which has advantages virtually completely overcoming a good many of the prior art problems, disadvantages and limitations, such as certain of those mentioned hereinbefore, and all of which advantages flow from and occur by reason of the specific features of the invention pointed out hereinafter.

SUMMARY OF THE INVENTION

Generally speaking, the improved composite apparatus of the present invention comprises solar energy conversion apparatus provided with, and having coupled thereto, an automatic cut-in auxiliary-heat-supplying standby apparatus cooperating with each other in a manner such as to provide either a substantially constant desired level of thermal energy input into a working medium of the solar energy conversion apparatus or to provide such thermal energy input lying within a predetermined range extending between selected upper and lower magnitudes thereof.

In one preferred form, the solar energy conversion apparatus may be of a high-efficiency type such as is disclosed and claimed with greater particularity in my copending patent application entitled "AN IMPROVED SOLAR ENERGY CONVERSION APPARATUS", Ser. No. 155,795, filed concurrently herewith, although the composite combination of the present invention is not specifically limited to that highly-advantageous type of solar energy conversion apparatus. In said preferred form of the invention, the solar energy conversion apparatus comprises radiation-concentrating and line-focusing optical means operable to receive solar radiation as input energy in a relatively large area input region, and in relatively diffuse form, and to modify same into concentrated output radiation of an effectively high thermal energy density in a relatively smaller area concentrated heat transfer region of a line-like configuration whereby to have effectively greatly reduced the radiation area. Also included are heat-transfer and energy-conversion means positioned in the heat transfer region of line-like configuration and having an outer radiation reception surface adapted to be impinged by said area-reduced, effectively energy-density-concentrated output radiation from said radiation concentrating optical means and having a thermally efficient radiation-to-heat conversion layer operable to convert a large portion of received concentrated infrared radiation into heat in a containment region on the inner side of said surfce and in a working medium contained therein, with said radiation reception surface being thermally conductively provided with and attached to a closed cycle containment apparatus having an inner contact surface and having a working medium contained against said inner contact surface thereof. The closed cycle containment apparatus comprises a number of series-connected hollow flow sections provided with intervening one-way check valve means therebetween allowing the passing of a progressively heated working medium through said valve means and the corresponding flow sections of the containment apparatus in one forward direction only, with succeeding flow sections of said containment apparatus between succeeding sets of said one-way valve means being placed for individual reception of corresponding different quantities of line-focused solar radiation for incremental heating, in a series manner, of the working medium in successive flow sections of the containment apparatus whereby to incrementally increase the temperature and/or pressure of the working medium along the complete length of said containment apparatus until it reaches a desired high temperature and/or pressure at a thermal-energy-output-utilization end thereof adapted to be connected to some desired form of thermal energy utilization apparatus adapted to effectively reduce the temperature and pressure of the working medium as a consequence of the effective extraction of substantial quantities of energy from the working medium by such utilization apparatus. A return flow line is, also, adapted to be connected from an output side of such a thermal energy utilization device back to a low-thermal-energy input end of the containment apparatus.

In one preferred form, the apparatus includes a plurality of the radiation concentrating optical means, with each being positioned for causing its line-focused, energy-concentrated output infrared radiation to impinge upon the heat transfer region associated with the radiation reception surface of a different one of the series-connected flow sections of the containment apparatus.

In one preferred form, the apparatus includes duration-of-operation-extension means cooperably connected with respect to an output portion of the containment apparatus and operable to effectively extend the period of time of useful solar energy conversion.

In one preferred form, the above-mentioned duration-of-operation-extension means comprises solar-position-following motor means drivingly coupled with respect-to-said radiation concentrating optical means whereby to controllably move the corresponding radiation input region in a solar energy-maximizing manner while maintaining the proper line-focused concentrated output radiation thereof directly on the corresponding radiation reception surface.

In another form of the invention, the duration-of-operation-extension means may alternatively or additionally comprise a plurality of said radiation concentrating line-focusing optical means spaced from each other in the direction of the path of solar travel so as to be effectively optimally operable at different sequential, series-related but adjacent time periods.

The thermal-energy-utilization apparatus is positively included in certain forms of the invention and, in one version thereof, comprises thermal-energy-to-electrical-energy conversion means, which, in one preferred form, may take the form of a heat engine, such as an expansion turbine, or the like (although not specifically so limited in all forms thereof), adapted to produce a rotary mechanical output coupled to electric power producing means, such as a generator, alternator or the substantial equivalent thereof, while in certain other forms, a direct conversion of heated fluid medium to electrical energy may substitute in lieu of a conventional turbo-generator means and may comprise a magneto-hydrodynamic type of electrical generator means, or any substantial functional equivalent thereof.

Furthermore, the composite apparatus includes controllably operable auxiliary heating means in heat transfer relationship with respect to some portion of said containment apparatus and the working medium contained therein and normally being inoperative but being provided with heat-sensing means in controlling relationship with respect to said auxiliary heating means and in heat-sensing relationship with respect to said containment apparatus and the solar-energy-heated working medium contained therein whereby a reduction in the heating effect produced by the radiation concentrating optical means below a pre-selected level will be sensed by said heat-sensing means and will automatically start the operation of said auxiliary heating means and will subsequently control the level of operation thereof so as to substantially maintain a pre-selected level of heat transfer from the combination apparatuses into said closed cycle containment apparatus and the working medium contained therein, said containment apparatus has an effective output thermal-energy-utilization end thereof adapted to be connected to some desired form of thermal energy utilization apparatus adapted to effectively reduce the temperature and pressure of the working medium as a consequence of the effective extraction of substantial quantities of energy from the working medium by such thermal energy utilization apparatus and a return flow line adapted to be connected from an output side of such a thermal energy utilization device back to a low-energy input end of said containment apparatus on the upstream end of the portion thereof adapted to be heated by said radiation concentrating optical means and/or said auxiliary heating means.

In one preferred form, the auxiliary heating means comprises a source of energy provided with, and connected to, controllably-adjustable heat-producing means and initiating means controllably coupled to, and controlled by, the heat-sensing means for effective operation thereby, and further comprises a portion of the closed-cycle containment apparatus arranged in close juxtaposition to the heat-producing means for effective heat transfer therebetween after initiation of operation of the heat-producing means has occurred.

OBJECTS OF THE INVENTION

With the above points in mind, it is an object of the present invention to provide a novel, improved composite energy conversion apparatus or system including an improved solar energy conversion apparatus and an automatic cut-in auxiliary-heat-supplying standby apparatus coupled to each other in a manner such as to transfer a total amount of thermal energy as thermal energy input into the working medium of a closed cycle power conversion system at either a substantially constant desired level or so as to lie within a desired range extending between lower and upper magnitudes of such total thermal energy input transferred to the working medium.

It is a further object to provide a composite energy conversion system of the character referred to herein wherein the solar energy conversion apparatus portion thereof is of a novel high-efficiency type capable of producing a relative high temperature in the output working medium without the necessity of employing very large, fragile and expensive optical systems and which thus, is well-suited for providing converted solar energy input to a power-producing heat engine and which, further, is of the character referred to herein, generically and/or specifically, and which may include any or all of the features referred to herein, either individually or in combination, and which is of extremely easy-to-manufacture, easy-to-package, easy-to-ship, and easy-to-use construction and which is capable of being manufactured in a variety of sizes, shapes, styles, materials, qualities and/or price ranges—all at a relatively low cost, both as to the initial cost (including production set-up cost, tooling cost and the like) and as to the subsequent per-unit manufacturing cost, whereby to be conducive to widespread production, distribution, sale and use of the novel solar energy conversion apparatus of the present invention for the purposes outlined herein, or for any other substantially functionally equivalent purposes.

Further objects are implicit in the detailed description which follows hereinafter (which is to be considered as exemplary of, but not specifically limiting, the present invention), and said objects will be apparent to persons skilled in the art after a careful study of the detailed description which follows.

For the purpose of clarifying the nature of the present invention, several exemplary embodiments of the invention are illustrated in the hereinbelow-described figures of the accompanying drawings and are described in detail hereinafter.

BRIEF DESCRIPTION OF THE DRAWINGS

FIG. 2 is a representative somewhat diagrammatic and schematic enlarged view (with certain items removed for drawing simplification reasons) showing a representative one of the radiation-concentrating and line-focusing optical means (in this case comprising lens means although it may comprise mirror or reflector means) and illustrates it as receiving solar radiation as input energy coextensive with a relatively large area input region, and in relatively diffuse form, and operating to modify same into concentrated output radiation of an effectively high thermal energy density type in a much smaller area concentrated heat transfer or output region which, in the form illustrated, is essentially of an almost line-like configuration (actually in the form of a long thin rectangle) focused on one portion of closed-cycle containment apparatus (usually comprising one of a number of series-connected hollow flow sections provided with intervening one-way check valve means therebetween) allowing the passing of a progressively heated working medium therethrough.

DESCRIPTION OF THE PREFERRED EMBODIMENTS

Figure 1:
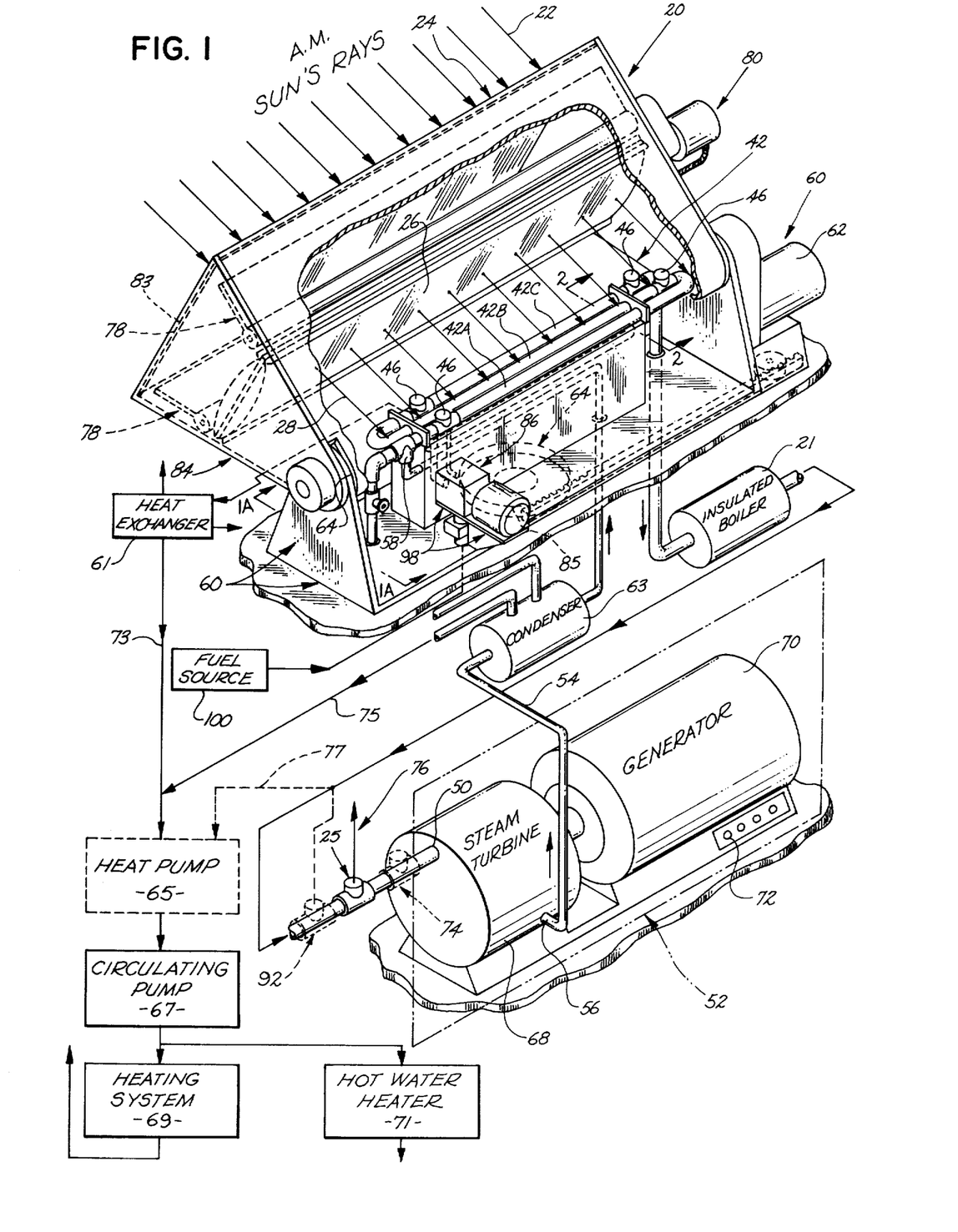
FIG. 1 is a somewhat diagrammatic, schematic and simplified isometric view of one exemplary embodiment of the present invention showing one exemplary overall complete system embodying the invention.
Figure 1A:
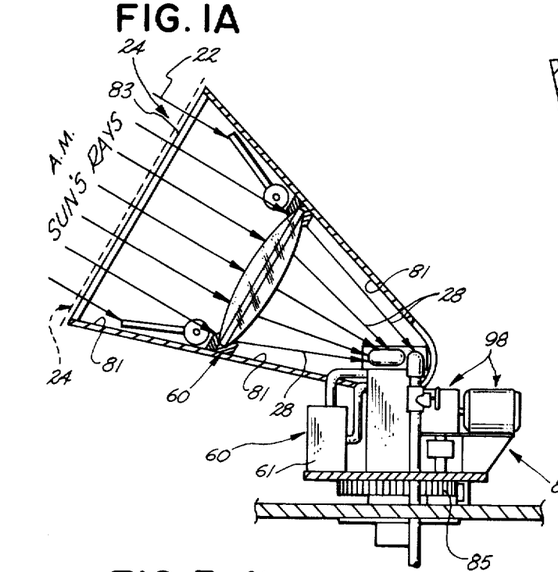
FIG. 1A is an end view taken just inside of the near end wall of the lens housing so that interior portions can be seen in full end elevation. Also, the entire solar energy-receiving structure is still shown in substantially the same early morning position as shown in FIG. 1.

The solar energy conversion apparatus of the exemplary first form of the invention comprises radiation-concentrating and line-focusing optical means, one form of which is generally indicated by the reference numeral 20, which is operable to receive solar radiation, such as that diagrammatically shown at 22, as input energy in a relatively large area input region, such as that generally designated by the reference numeral 24, substantially area-coextensive with (or somewhat larger than) the outer surface of the lens means indicated at 26, which comprises the particular, but non-limiting type of optical means, generally indicated at 20, illustrated in the exemplary first form of the invention. The arrangement is such as to take the relatively diffuse solar radiation 22 coextensive with the relatively large area input region 24 and to modify same into concentrated output radiation 28 of an effectively high thermal energy density in a relatively smaller area concentrated heat transfer region 30 and which, in a preferred form, is of generally line-like configuration (actually a configuration in the shape of a long narrow rectangle, but referred to herein as "line-like") whereby to have effectively greatly reduced the output radiation area, indicated generally at 32, which is shown as being substantially area-coextensive with the heat transfer region 30.

The preferred form of apparatus also is provided with a heat transfer energy conversion means 34 positioned in the previously mentioned heat transfer region 30 (and actually completely area-coextensive therewith) and having an outer radiation reception surface 36, which is also area-coextensive with the previously-mentioned heat transfer region 30 and which is adapted to be impinged by the area-reduced, effectively energy-density-concentrated output radiation 28 from the radiation-concentrating optical means 20 and either having, or effectively itself comprising, a thermally efficient radiation-to-heat conversion layer, also designated by the reference numeral 34, operable to convert a large portion of received concentrated infrared output radiation 28 into heat in a containment region, indicated generally at 38, lying on the inner side of said surface or conversion layer 34 and containing a working medium, such as the fluid working medium indicated at 40.

Figures 1B, 1C, 3, 4:
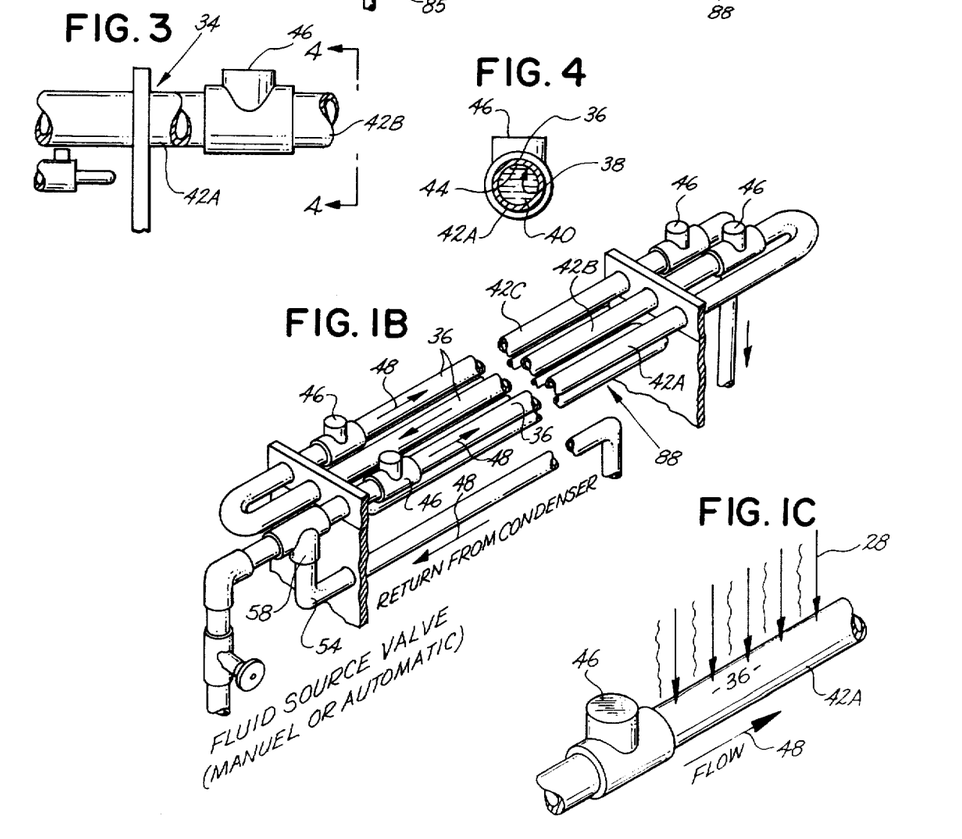
FIG. 1B is a somewhat enlarged fragmentary isometric view of the radiation-receiving part of the exemplary closed-cycle containment apparatus of the first form of the invention shown for exemplary purposes only.
FIG. 1C is a further enlarged and even more fragmentary isometric view of the nearest one of the three exemplary series-connected flow sections shown in FIG. 1B and illustrates further details of the structure thereof.
FIG. 3 is an exterior view of the radiation reception surface carried by the closed-cycle containment apparatus portion of FIG. 2 as seen in the direction of the arrows 3—3 of FIG. 2.
FIG. 4 is an enlarged fragmentary cross-sectional view taken substantially along the plane and in the direction indicated by the arrows 4—4 of FIG. 3.
Figure 2:
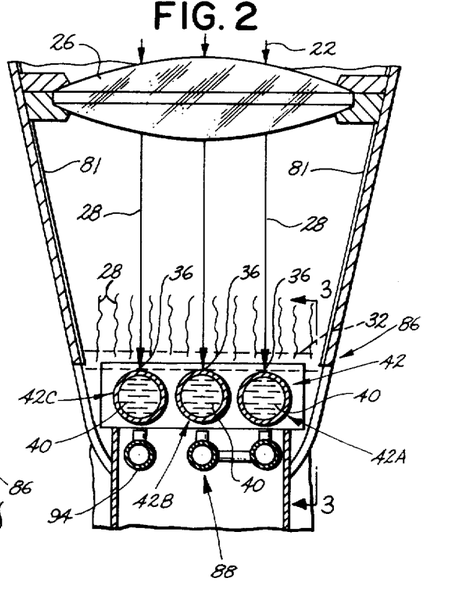

It should be understood that the radiation reception surface 36 and the radiation-to-heat conversion layer 34 are effectively thermally conductively provided with, and are attached to and comprise a part of, a complete closed-cycle containment apparatus, which is generally designated by the reference numeral 42 and which has an inner contact surface 44 in direct heat-transfer contact with the previously-mentioned working medium 40 along the complete extent of the conversion layer 34. The closed-cycle containment apparatus 42, in the preferred form illustrated, comprises a number of series-connected hollow flow sections 42A, 42B, 42C, etc., with each flow section being designated by the reference numeral 42, followed by the next succeeding letter of the alphabet in capitalized form. Between each of the hollow flow sections, such as the representative ones shown at 42A, 42B, and 42C, an intervening one-way check valve means 46 is provided and operates in a manner such as to allow the passing in a forward direction only, of the progressively heated working medium 40 through each of the flow sections 42A, 42B, and 42C, and through each of the corresponding intervening check valve means 46.

Figures 5, 6:
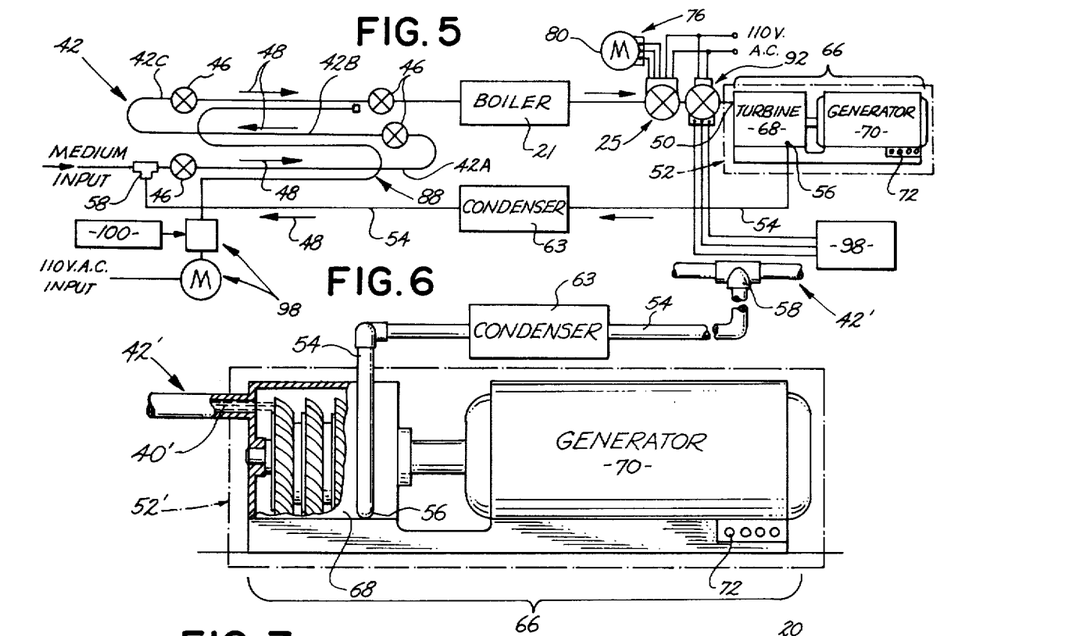
FIG. 5 is a circuit schematic of the closed-cycle containment apparatus having a portion thereof shown in FIGS. 2-4 and clearly shows a number of series-connected hollow flow sections, each substantially of the type shown in detail in FIGS. 2-4 and shows the provision of a plurality of intervening one-way check valve means between said sections whereby to allow the passing of a progressively heated and successively heated working medium through the plurality of hollow flow sections and the plurality of intervening check valves and in a forward flow direction only. This view also shows a thermal-energy-output-utilization end of the containment apparatus adapted to be connected to any of a variety of different types of thermal energy utilization apparatus, one exemplary form of which is shown in place connected thereto, and this view also shows a return-flow line provided with an output terminal for connection to an output side of the thermal energy utilization apparatus back to a low-thermal-energy input end of the containment apparatus.
FIG. 6 illustrates one form of the thermal-energy-output-utilization apparatus, shown in block diagrammatic form in FIG. 5, and in the exemplary but non-limiting form in FIG. 6, it takes the form of thermal-energy-to-electrical-energy conversion means which is illustrated as comprising an expansion turbine having the high temperature high pressure working medium passing therethrough and driving a rotary mechanical output shaft coupled to electrical generator means (which shall also, mean alternator means) whereby to produce a corresponding electrical energy output while simultaneously dropping the pressure and/or temperature of the working medium as it passes through the expansion turbine means.

The above-mentioned direction of flow in the containment apparatus 42 is indicated by the arrow 48 and it should be clearly noted that the series arrangement of the containment apparatus flow sections and check valve means is such that individual reception of corresponding different quantities of line-focused solar radiation 22 on the radiation reception surface 36 of each corresponding flow section 42A, 42B, and 42C provides for incremental heating in a series manner of the working medium 40 in each successive flow section of the containment apparatus 42 whereby to incrementally increase the temperature and/or pressure (one or the other or both) of the working medium 40 along the complete length of the containment apparatus 42 until it reaches a high temperature and/or pressure at a thermal-energy-output-utilization end thereof, indicated at 50, which in turn, is adapted to be connected to some desired form of thermal energy utilization apparatus, such as is diagrammatically indicated at 52, which is adapted to effectively reduce the temperature and/or pressure of the working medium 40 as a consequence of the effective extraction of substantial quantities of energy from the working medium 40 by such utilization apparatus 52.

Also, the containment apparatus 42 is provided with a return flow line 54 adapted to be connected from an output side 56 of such a thermal energy utilization apparatus 52 back to a low-thermal energy input end 58 of the containment apparatus 42.

It should be noted that in the preferred form shown, a composite radiation-concentrating optical means 2 is provided and is arranged to cause its concentrated output infrared radiation 28 to impinge upon each of the three illustrated different radiation reception surfaces 36 of each different one of the plurality of series-connected flow sections 42A, 42B, 42C, etc., whereby to cause the above-described type of sequential energy step-up operation to occur relative to the contained forward-moving working medium 40. However, the invention contemplates the use of a plurality of the radiation-concentrating optical means, with each different one being focused on an individual different one of the series-connected flow sections. Both arrangements and any functional equivalents thereof are intended to be included.

Figures 7, 8:
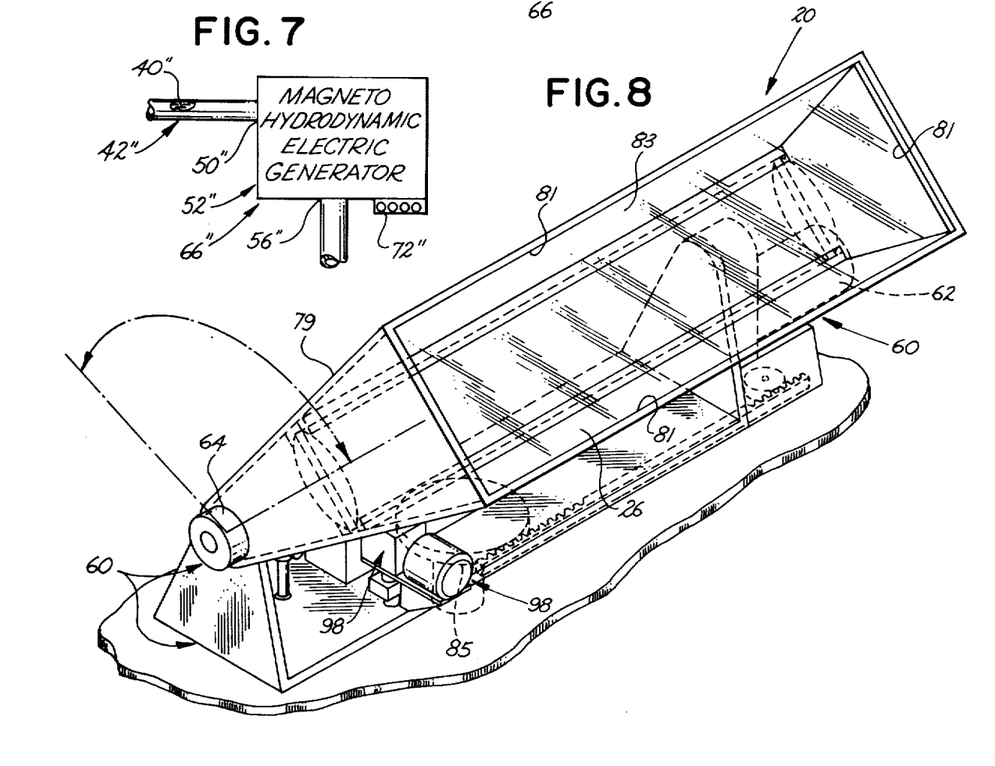
FIG. 7 merely illustrates, in fragmentary greatly simplified diagrammatic form, one exemplary alternate form of the thermal-energy-to-electrical energy conversion means of FIG. 6 wherein it comprises a kind of convertor known in the art as magneto-hydrodynamic means.
FIG. 8 illustrates one form of duration-of-operation extension means which, in this case, comprises solar-position-following motor means drivingly coupled with respect to the radiation-concentrating optical means whereby to controllably move the corresponding radiation input region in a solar-energy-maximizing manner while maintaining the proper line-focused concentrated output radiation thereof directly on the corresponding radiation reception surface (or surfaces.)

In one preferred form of the invention, duration-of-operation extension means, indicated generally at 60, is provided and is cooperably connected relative to the containment apparatus 42 and is operable to effectively extend the period of time of useful solar energy conversion by the apparatus.

In the exemplary first form of the invention illustrated, the duration-of-operation extension means 60 takes a particular form wherein it comprises solar-position-following motor means 62 drivingly coupled by guiding mechanism, such as indicated at 64, with respect to the radiation-concentrating optical means 20, whereby to controllably move the corresponding radiation input region 24 in a solar-energy-maximizing manner while maintaining the proper line-focused concentrated output radiation 28 directly on the corresponding radiation reception surface 36. This, of course, is applicable to each optical means 20 and to each radiation reception surface 36 carried by each different one of the plurality of flow sections, 42A, 42B, and 42C of the containment apparatus 42 whereby to cause the optimum operation of the entire apparatus throughout the entire daylight period in the region where the apparatus is located.

It should be understood that the motor means 62 and the associated guiding mechanism 64 may merely comprise a form of clock drive and may be electrically energized, mechanically energized, or energized in any manner which has been employed in such clock motor drives. It should also be noted that it should be provided with either automatic or manual reset means for resetting the apparatus back to the initial position at the end of a day of operation in an optimum position for the first rays of the morning sun of the following day.

In the exemplary arrangement best illustrated in FIG. 6, the previously-mentioned thermal energy utilization apparatus 52 takes one specific, but non-limiting form and, therefore, is designated by the same reference numeral, primed, however. As shown in FIG. 6, said thermal-energy-utilization apparatus 52' comprises thermal-energy-to-electrical-energy conversion means taking the form of turbine-generator means, indicated at 66, which is operable to receive the high temperature and/or high pressure working medium 40' and to effectively produce a corresponding electrical energy output while simultaneously dropping the pressure and/or temperature of the working medium 40' prior to the return of same to the input side 58' of the closed-cycle containment apparatus 42'. As illustrated, the turbine-generator means 66 includes an expansion turbine 68 coupled to an electrical generator means 70 which has output electrical terminals 72.

FIG. 7 merely illustrates in fragmentary, greatly simplified form, a modification of the thermal-energy-to-electrical energy conversion means 52' of FIG. 6 which is slightly modified to comprise a kind of convertor known in the art as a magneto-hydrodynamic electrical generator means, which is designated by the reference numeral 66" and which is operable in a slightly different manner to receive the high temperature and/or high pressure working medium 40" and to convert the dropping of same more directly into output electrical energy.

Figures 8A, 9:
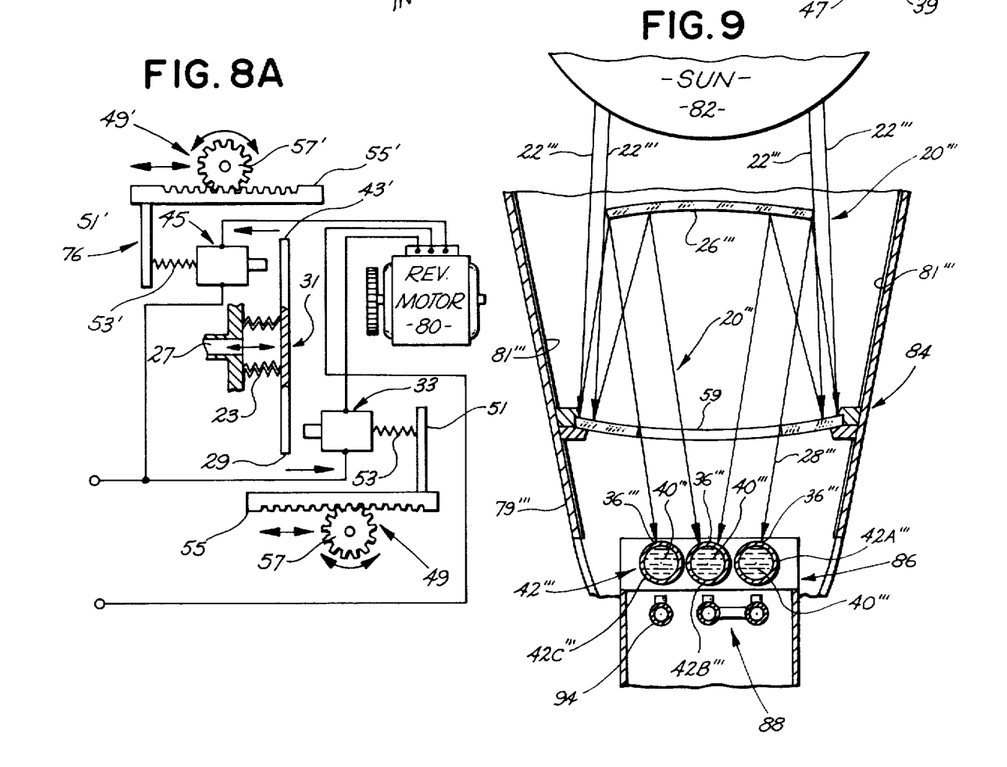
FIG. 8A illustrates in diagrammatic schematic and greatly simplified form, one representative version of controlled circuitry of an electrically energized type which will cause operation of shutter means in a negative feedback sense, such as to stabilize the pressure of a working medium in the containment apparatus at the output end of the system to a safe value.
FIG. 9 is a very fragmentary diagrammatic, schematic, illustration of an exemplary one of the plurality of radiation-concentrating line-focusing optical means, in this case, is shown converted from lens means to mirror or reflector means, but otherwise, is substantially functionally equivalent to the first form illustrated.
Figure 8B:
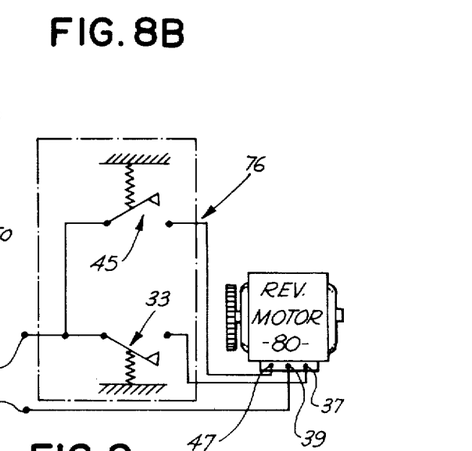
FIG. 8B illustrates the primarily physical showing of FIG. 8A in more electrical schematic detail whereby to clarify both one exemplary structure thereof and one exemplary mode of operation thereof.
Figure 8C:
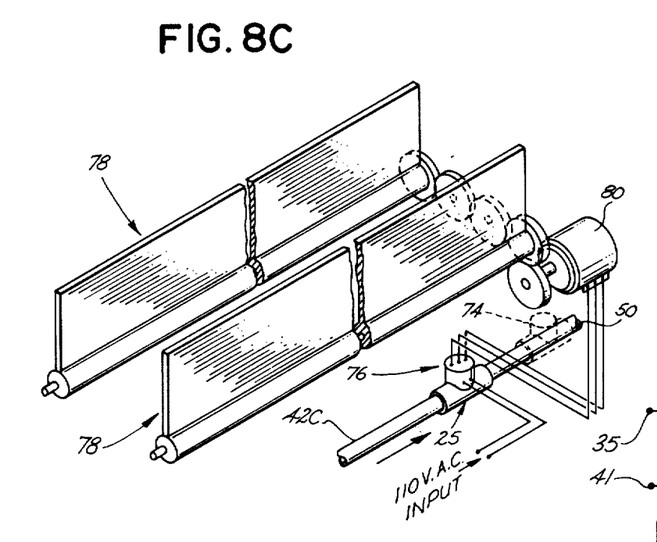
FIG. 8C is a fragmentary isometric showing of the shutter means and negative feedback control means of FIGS. 8A and 8B.

It should be noted that, in a preferred form, the closed-cycle containment apparatus, indicated generally at 42, is preferably provided with appropriate safety means for preventing excessive pressure build-ups which might occur under some conditions of operation of the apparatus from occurring or from reaching dangerous magnitudes. In the exemplary form illustrated, there are two such safety apparatuses, each of a different type and it should be understood that either or both, or any other substantial equivalents, may be employed. They are illustrated at 74 in the case of a pressure relief valve, and in diagrammatic form at 76, in the form of negative feedback apparatus adapted in response to the reaching of a predetermined upper magnitude of pressure of the working medium to cause shutter means, indicated diagrammatically at 78, to be operated by appropriate motor means 80 in a negative sense such as to reduce the amount of input solar radiation 22 received by each of the radiation-concentrating optical means 20. This will, of course, reduce the amount of solar-to-thermal energy conversion which occurs and which is imparted to the working medium, thus tending to reduce any such dangerously high pressure which might inadvertently occur in the working medium. FIGS. 8A & 8B illustrate in diagrammatic schematic and greatly simplified form, one form of controlled circuitry of an electrically-energized type which will cause operation of the shutter means 78 in the negative feedback sense mentioned above in response to the undesired elevation of pressure of the working medium to a predetermined tripper point.

In the form illustrated in FIGS. 8A and 8B, the so-called negative feedback apparatus 76 comprises a pressure and/or temperature sensitive means in contact with the interior high pressure and high temperature working medium adjacent to the output of the system although it could be located adjacent to the boiler 21 if desired, or at any other desired location, and it is shown as comprising a "Sylphon" type of extendable and contractable bellows 23 which is part of the sensor generally indicated at 25. The bellows 23 has an opening 27 into its interior which communicates with the high temperature and high pressure working medium, while the exterior of the bellows 23 is at a lower temperature such as might be provided by ambient atmosphere. Thus, when the working medium's temperature and pressure rise beyond a predetermined point, the end 29 of the actuating arm 31 strikes the microswitch 33 and temporarily closes it and consequently closes the circuit from one power input terminal 35 to one motor terminal 37 of the reversible motor 80 which has its center terminal 39 connected directly to the other power input terminal 41, thus energizing the reversible motor 80 in a shutter closing direction which will have the effect of reducing the temperature and pressure of the working medium. This action will continue for as long as the spring-biased mounting of the microswitch 33 permits. Ultimately, when the temperature and pressure of the working medium drop, either as a result of the above-described action or otherwise, the bellows 23 will contract until the other end 43 of the actuating arm 31 moves into contact with the other microswitch 45 which will temporarily close another circuit from the power input terminal 35 to the remaining motor terminal 47 which will again energize the reversible motor 80, but in the opposite direction comprising a shutter-opening direction of movement.

In order to make it possible to easily adjust the maximum working-medium pressure at which the shutter-closing switch 33 is temporarily closed, one exemplary form of manual adjustment means is generally indicated by the reference numeral 49 and is shown as comprising a movable mounting member 51 and biasing spring 53 carrying the switch 33 in a movably mounted manner on a rack member 55 (which is adapted to be suitably slideably mounted by a mounting means not shown) and with the rack 55 being engaged by a pinion 57 which can be manually adjusted in either direction for changing the setting of the shutter closing switch 33. Exactly the same type of structure is employed for adjusting the other shutter opening switch 45 and since the adjustment means structure is the same, corresponding parts are designated by corresponding reference numerals primed, however, and will not be described in detail.

FIG. 9 illustrates in a very fragmentary and simplified form, a slight modification of an exemplary one of the plurality of radiation-concentrating line-focusing optical means, each shown at 20 in the first form of the invention. In this case, the representative modified one of same is designated by the reference numeral 20''' and is shown as having been modified from a lens 26 of the first form of the invention to multiple concave mirror constructions 26''' which functionally cooperate relative to the input and output radiation 22''' and 28''' in a manner fully functionally equivalent to the operation of each corresponding lens means 26 of the first form of the invention.

In the example illustrated, the upper (or outer) mirror 26''' is relatively narrow in a width direction so as to allow most of the incoming solar radiation to pass it and to strike the much wider lower (or inner) mirror 26''', which then concentrates and reflects said solar radiation back to the concave side of the upper (or outer) mirror 26''', which then further concentrates and reflects the received rediation back downwardly (or inwardly) through the slot 59 and onto the tubes 42''', which are to be heated by the doubly-concentrated solar radiation.

This arrangement is exemplary only and may be modified in any of several ways, such as employing partially silvered and/or dichroic mirros (or mirror portions) or by angularly relating the mirrors with respect to source and/or object so as to optimize the solar radiation input to the system, and all such are intended to be included and comprehended within the broad scope of the invention. Otherwise, the apparatus is essentially the same as the previously fully-described first form of the invention. Therefore, it is believed that any further and more detailed description of the slight modification of FIG. 9 would be redundant and, consequently, no such unneeded detailed description is included herein, reference being made to the previous description of the first form of the invention for full clarification of the operation of the FIG. 9 slight modification.

Figure 10:
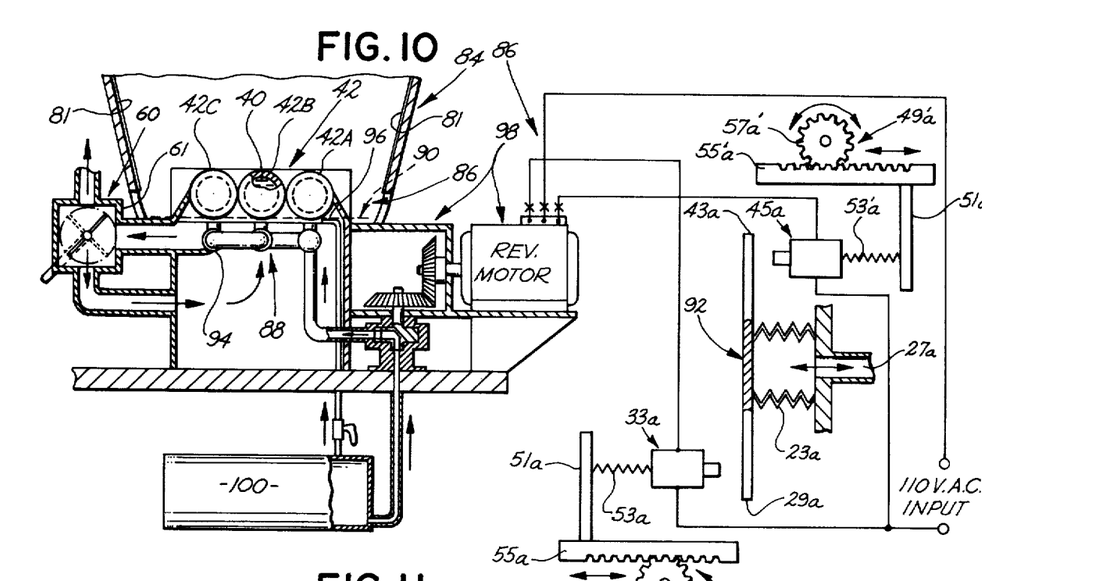
FIG. 10 is a fragmentary, diagrammatic, schematic, somewhat enlarged view illustrating in greater detail the automatic cut-in auxiliary-heat-supplying standby apparatus which takes over and either replaces or supplements the solar energy conversion apparatus whenever the transferred solar energy falls below a predetermined or preselected magnitude, or, alternatively, is modified so as to lie within a selected range of magnitudes extending between a lower magnitude and and upper magnitude.

FIG. 10 illustrates in fragmentary, diagrammatic somewhat schematic form, a preferred version of the invention which preferably is embodied in all variations or modifications thereof, although it is particularly described in connection with the first form of the invention illustrated and previously described in detail.

As illustrated, FIG. 10 shows the provision of automatic cut-in auxiliary heat-supplying standby apparatus 86 which is intended to take over and either replace or supplement the rest of the solar energy conversion apparatus, such as indicated at 84, whenever the transferred solar energy falls below a predetermined or preselected magnitude, or, alternatively, is modified so as to lie within a selected range of magnitudes, extending between a lower magnitude and an upper magnitude.

In the exemplary form illustrated, the auxiliary-heat-supplying standby apparatus 86 may be said to comprise auxiliary heating apparatus 88 in heat transfer relationship with respect to some portion of the containment apparatus 42 (said portion being indicated at 90 and the working medium 40 contained therein, with the auxiliary heating means 88 normally being inoperative but being provided with heat-sensing means 92 in controlling relationship with respect to the auxiliary heating means 88 and in heat-sensing relationship with respect to the containment apparatus 42 and the solar-energy-heated working medium 40 contained therein in a manner such that a reduction in the heating effect produced by the radiation-concentrating optical means 20 below a preselected level will be sensed by the heat-sensing means 92 and will automatically cause the initiation or the starting of operation of the auxiliary heating means 88, both with respect to the feeding of fuel to a burner 94 and the ignition of same by any suitable type of ignition apparatus, such as that shown diagrammatically at 96, for example. Also, the servo means 98 controlled by the heat-sensing means 92 will control the level of operation of the burner 94 of the heat-sensing means 92 so as to substantially maintain a preselected level of heat transfer from the combination apparatuses into the closed-cycle containment apparatus 42 and the working medium 40. Of course, the apparatus includes a source of fuel, indicated generally at 100, which usually comprises a fuel tank provided with a supply of fuel and means for feeding same to the burner 94. Said feeding means may comprises motor-driven pump means, or pressurization of the fuel itself, or other conventional fuel feeding means well-known in the art and, therefore, not detailed.

Figure 11:
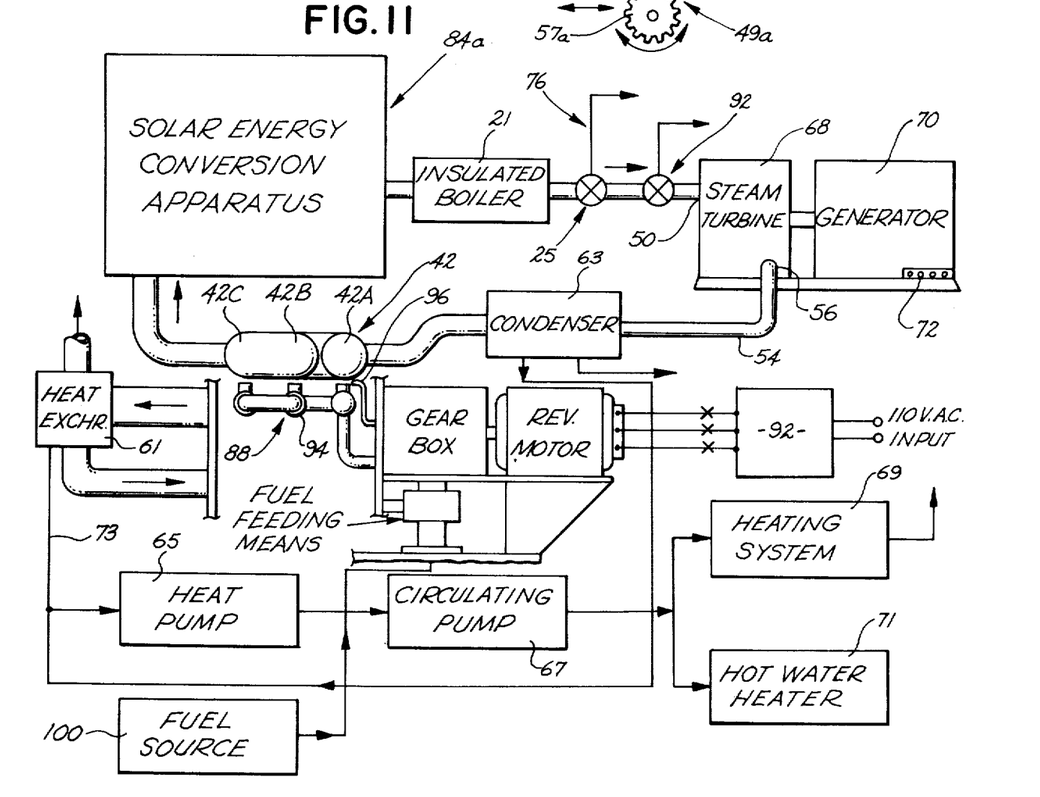
FIG. 11 is an almost entirely diagrammatic and schematic view provided for the purpose of making it quite clear that the composite invention is not in all cases limited to the use of the preferred form of solar energy conversion apparatus illustrated in FIGS. 1-9 inclusive, but may comprise other substantial equivalents thereof or even alternate and possibly less effective solar energy conversion apparatuses which require such supplementation for continued operation substantially independent of variations in the received solar energy radiation cycle.

FIG. 11 is a view quite similar to FIG. 10, but is intended to show that the auxiliary-heat-supplying standby apparatus 86 can be associated with a different type of solar energy conversion apparatus such as the one shown entirely diagrammatically at 84a in FIG. 11, which is intended to mean that there is no specific limitation to the use of the highly desirable type of solar energy conversion apparatus specifically illustrated and described in FIGS. 1–10 inclusive.

It should be noted that, if desired, the apparatus may contain, and use, both previously described control systems, as generally indicated at 76 (best shown in FIG. 8A and FIG. 8B) and as generally indicated at 86 in FIG. 10, or may contain, and use, only one of same, as desired, which may be used for the previously-described single purpose, or which may be used for the previously described purposes of both control systems (76 & 86). For example, the so-called servo means 98 (including reversible motor) of FIG. 10, may be the same motor as the reversible motor 80 of the previously-described shutter-controlling negative feedback control system 76 of FIG. 8A and FIG. 8B, in certain forms of the invention.

It should also be noted that the optional exhaust heat exchanger 61 of FIG. 11 may, in certain forms of the invention, be effectively coupled, either directly or by way of effective heat pump means 65 or circulating pump means 67 to either a structure heating system 69, a hot water heater 71, or both, by coupling ducts indicated diagrammatically at 73.

It should be noted that, in the exemplary, but non-specifically-limiting, first form of the invention illustrated, the solar radiation receiver 20 is shown as including a closed housing 79 of a downwardly (or inwardly) converging shape having reflective inner surfaces 81 and a transparent outer window 83, all of which maximize both the receptivity and the retentivity of the housing 79 for solar radiation. However, this structure is merely one of many which can be used within the broad scope of the invention.

Also, it should be noted that the optional boiler 21 is shown diagrammatically rather than in full structural detail. In one preferred form it comprises an insulated boiler, and in a further preferred version thereof, it will have maximized resistance to corrosion and/or scale deposition or formation by reason of having an inner tank or lining made of corrosion-resistant and scaling-resistant material, such as stainless steel for example, supported exteriorly by heavier-gauge metal or structural material and complete insulation, preferably of types effectively insulating against heat loss by thermal conduction and by thermal radiation.

Additionally, please note that the optional condenser 63 is shown entirely diagrammatically in the exemplary, but non-specifically-limiting, first form of the invention illustrated, and may comprise any of a number of different types of condensers, and, considered as a heat exchanger, either with or separately from, the boiler 21 may be coupled by way of coupling ducts indicated diagrammatically at 75 and/or 77, respectively, either directly or by way of effective heat pump means 65 or circulating pump means 67 to either a structure heating system 69, a hot water heater 71, or both.

In the exemplary, but non-specifically-limiting first form of the invention illustrated, the mounting base portion of the so-called duration-of-operation extension means 60 also includes an underlying additional rotary base 85 arranged to rotate the entire solar-radiation-receiving structure 20 around a vertical axis (and an additional transverse horizontal axis) to compensate for the day-by-day slight shifting of the sun's orbital path from sunrise to sunset.

It should be noted that the shutter means 78 and the apparatus for controlling same are optional in certain forms of the invention.

The apparatus of the present invention lends itself well to use as almost any desired type of stationary power plant for supplying power (mechanical or electrical heat, hot water, hot air, or the like, for a home, apartment house, condominium, commercial or industrial building or structure, or for power station use, or the like. It lends itself equally as well to use as almost any desired type of mobile power plant for any movable carrier such as a motor vehicle, boat, ship, train, or the like and for the same (or substantially equivalent) multiple purposes, etc.

Each of the so-called check valve means 46 has been referred to herein in that manner primarily for simplification purposes. Actually, in most cases, the check valve means may be so constructed as to function substantially normally, when closed, in a backflow direction, but to have modified and different forward flow characteristics of an inter-related, correlated, timed, and/or pressure-responsive type whereby to facilitate the forward flow of the working medium in a contained-energy-increasing manner with respect to input and output ends of the multiple flow sections 42 (which usually are much greater in number than the representative three illustrated.) At least certain of the units 46 may be effectively provided with flow enhancement means including flow section effective cross-sectional area modification means and/or positive working-medium-movement-causing means to facilitate the movement of the energy-increased working medium past various selected ones of the check valves prior to effective characteristic reversal after the advanced working medium has been locked against reverse movement by the uni-directional flow characteristics of the check valves. It should be understood throughout, that the so-called check valves or check valve means, or equivalent expressions, in specification and claims shall be broadly construed as meaning flow-enhancing structures of the above-mentioned type which comprise the more specifically claimed and disclosed subject matter of co-pending application Ser. No. 155,795, filed June 2, 1980 now U.S. Pat. No. 4,376,372.

It should be understood that the figures and the specific description thereof set forth in this application are for the purpose of illustrating the present invention and are not to be construed as limiting the present invention to the precise and detailed specific structures shown in the drawing figures and specifically described hereinbefore. Rather, the real invention is intended to include substantially equivalent constructions embodying the basic teachings and inventive concept of the present invention.

What is claimed is:

1. An improved solar energy conversion apparatus for effectively converting solar radiation thermal energy into stored thermal energy contained in a captive working medium in a closed-cycle power conversion system and including auxiliary heating apparatus coupled thereto in a manner such as to provide a substantially constant desired level of thermal energy input into the working medium of the closed cycle power conversion system despite input solar radiation thermal energy variations, comprising: radiation-concentrating optical means operable to receive input solar radiation as input energy from a relatively large area input region and in relatively diffuse form and to modify same into concentrated output radiation of an effectively high-thermal energy density type in a relatively smaller area, radiation output, concentrated heated region; heat transfer and energy conversion means positioned in said smaller area radiation output, concentrated heat transfer region and having an outer radiation reception surface adapted to be impinged by the area-reduced, effectively energy-density-concentrated output radiation from said radiation-concentrating optical means and having a thermally-efficient radiation-to-heat conversion layer operable to convert a large portion of received concentrated infrared radiation into heat in a containment region on the inner side of said surface and in a working medium contained therein; said outer radiation reception surface being thermally conductively provided with and attached to a closed-cycle containment apparatus having an inner contact surface and having a working medium circulation system and further having a working medium contained therein and in inner heat transfer relationship with said inner contact surface thereof adjacent to and opposed to said outer radiation reception surface; said closed-cycle containment apparatus comprising a number of series-connected hollow flow sections provided with intervening one-way check valve means therebetween allowing the passing of a progressively heated working medium through said valve means and the corresponding flow sections of said containment apparatus in one forward direction only; succeeding flow sections of said containment apparatus between succeeding sets of said one-way valve means being placed for individual reception of corresponding different quantities of line-focused solar radiation for incremental heating in a series manner of the working medium in successive flow sections of the containment apparatus whereby to incrementally increase the temperature and pressure of the working medium along the complete length of said containment apparatus until it reaches a desired high temperature and pressure at a thermal-energy-output-utilization end thereof; and controllably operable auxiliary heating means in heat transfer relationship with respect to some portion of said containment apparatus and the working medium contained therein and normally being inoperative but being provided with heat-sensing means in controlling relationship with respect to said auxiliary heating means and in heat-sensing relationship with respect to said containment apparatus and the solar-energy-heated working medium contained therein whereby a reduction in the heating effect produced by the radiation-concentrating optical means below a preselected level will be sensed by said heat-sensing means and will automatically start the operation of said auxiliary heating means and will subsequently control the level of operation thereof so as to substantially maintain a preselected level of heat transfer from the combination apparatuses into said closed-cycle containment apparatus and the working medium contained therein, said containment apparatus having an effective output thermal-energy-utilization end thereof adapted to be connected to some desired form of thermal energy utilization apparatus adapted to effectively reduce the temperature and pressure of the working medium as a consequence of the effective extraction of substantial quantities of energy from the working medium by such thermal energy utilization apparatus; and a return flow line adapted to be connected from an output side of such a thermal energy utilization apparatus back to a low-energy input end of said containment apparatus on an upstream end of the portion thereof adapted to be heated by said radiation-concentrating optical means and/or said auxiliary heating means.

2. Apparatus as defined in claim 1, wherein said auxiliary heating means comprises a source of energy provided with and connected to controllably adjustable heat-producing means and initiating means controllably coupled to and controlled by said heat-sensing means for effective operation thereby, and further comprises a portion of said closed-cycle containment apparatus arranged in close juxtaposition to said heat-producing means for effective heated transfer therebetween after initiation of operation of said heat-producing means has occurred.

3. Apparatus as defined in claim 1, wherein said auxiliary heating means comprises a source of fuel provided with and connected to controllably adjustable burner means and ignition means controllably coupled to said heat-sensing means for operation thereby, and further comprises a portion of said closed-cycle containment apparatus arranged in close juxtaposition to said burner means for effective heat transfer therebetween after ignition of fuel supplied from said source of fuel to said burner means has occurred.

4. Apparatus as defined in claim 1, wherein thermal-energy-utilization apparatus is included and comprises thermal-energy-to-electrical-energy conversion means.

5. Apparatus as defined in claim 2, wherein thermal-energy-utilization apparatus is included and comprises thermal-energy-to-electrical-energy conversion means.

6. Apparatus as defined in claim 2, wherein thermal-energy-utilization apparatus is included and comprises thermal-energy-to-electrical-energy conversion means taking the form of turbine-generator means operable to receive the high temperature, high pressure working medium and to effectively produce a corresponding electrical energy output while simultaneously dropping the pressure and/or temperature of said working medium prior to return of same to the input side of said closed-cycle containment apparatus.

7. Apparatus as defined in claim 2, wherein thermal-energy-utilization apparatus is included and comprises thermal-energy-to-electrical-energy conversion means taking the form of magneto-hydrodynamic means operable in response to the reception of said high temperature, high pressure working medium to convert the dropping of same directly into output electrical energy.

8. Apparatus as defined in claim 3, wherein thermal-energy-utilization apparatus is included and comprises thermal-energy-to-electrical-energy conversion means.

9. Apparatus as defined in claim 3, wherein thermal-energy-utilization apparatus is included and comprises thermal-energy-to-electrical-energy conversion means taking the form of turbine-generator means operable to receive the high temperature, high pressure working medium and to effectively produce a corresponding electrical energy output while simultaneously dropping the pressure and/or temperature of said working medium prior to return of same to the input side of said closed-cycle containment apparatus.

10. Apparatus as defined in claim 3, wherein thermal-energy-utilization apparatus is included and comprises thermal-energy-to-electrical-energy conversion means taking the form of magneto-hydrodynamic means operable in response to the reception of said high temperature, high pressure working medium to convert the dropping of same directly into output electrical energy.

* * * * *